May 1, 1945.   A. R. LEUKHARDT   2,374,869
GEAR SHIFTING MECHANISM
Filed July 29, 1943
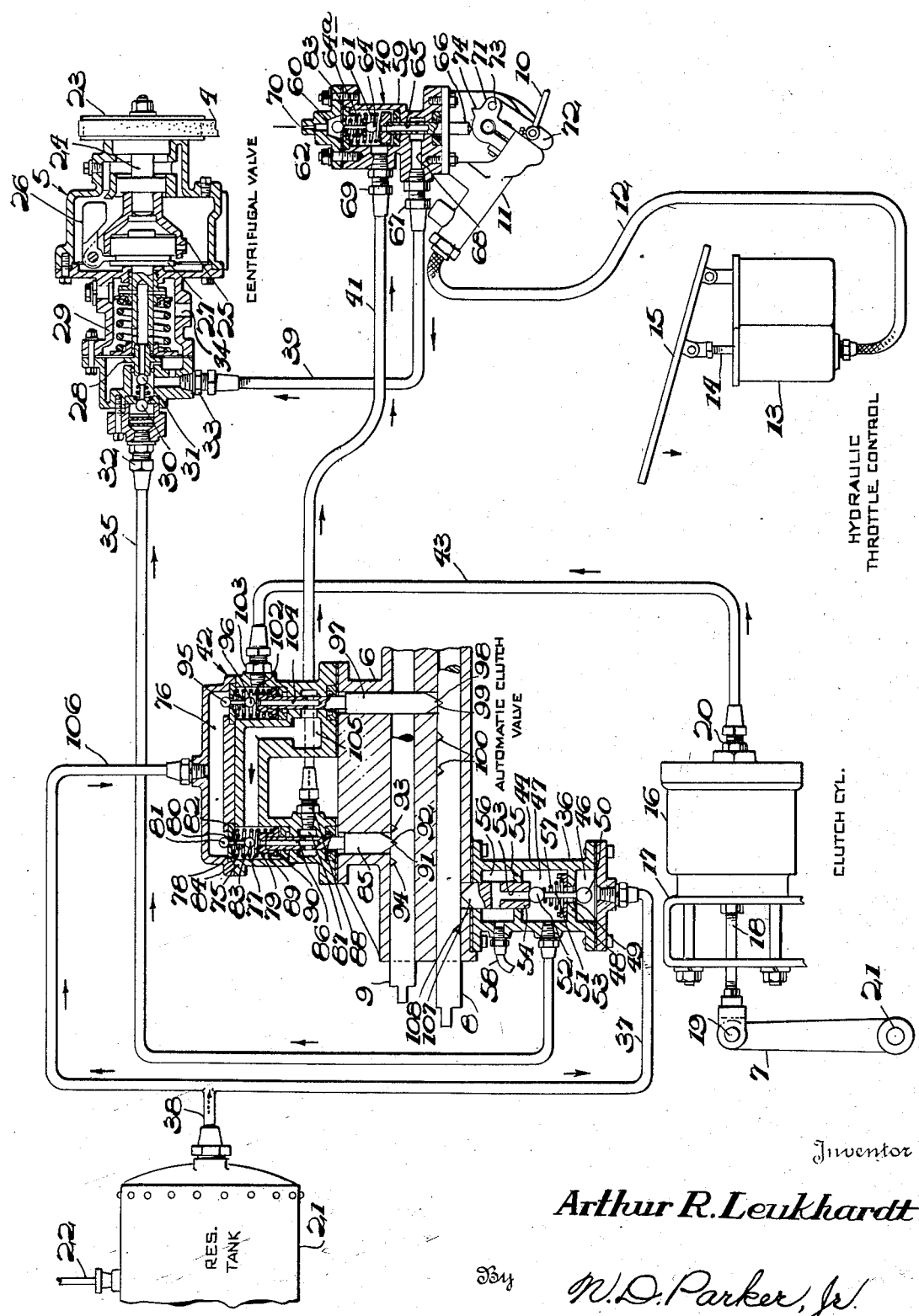
Inventor
Arthur R. Leukhardt.
By W. D. Parker, Jr.
Attorney Patented May 1, 1945

2,374,869

UNITED STATES PATENT OFFICE 2,374,869

GEAR SHIFTING MECHANISM

Arthur R. Leukhardt, Elyria, Ohio, assignor to Bendix-Westinghouse Automotive Air Brake Company, Elyria, Ohio, a corporation of Delaware Application July 29, 1943, Serial No. 496,639

12 Claims. (Cl. 192—01)

This invention relates to motor vehicle control mechanisms and more particularly to a mechanism enabling coordinated control of the vehicle transmission and clutch.

Vehicle control mechanisms have heretofore been provided wherein provision has been made for coordinated control of the vehicle transmission and clutch. In certain of the prior constructions, the clutches have been controlled by power operators and the latter have been governed not only by operation of the vehicle transmission but also by automatic control means responsive to the speed of the engine and by means responsive to the operation of the accelerator pedal of the vehicle, and in general the arrangement has been such that due to the action of the speed responsive means, disengagement and engagement of the clutch occurs during a certain range of engine speeds, such that below this speed the clutch is disengaged, while above this range the clutch is engaged.

One disadvantage of certain previous mechanisms of this type has been that with the transmission in neutral position, the operation has been such that the means responsive to engine speed has acted to maintain the clutch in disengaged condition, with resulting unnecessary wear on the thrust bearings in the clutch mechanism, and it is accordingly an object of the present invention to provide means for over-coming this undesirable condition.

Another object of the invention is to provide in a mechanism of the above type, means controlled directly by the gear shifting mechanism for insuring engagement of the clutch at all times when the transmission is in neutral position.

A further object of the invention is to provide, in a system of the above type, means controlled by the operation of the gear shifting mechanism for rendering the speed responsive control means ineffective to cause clutch disengagement when the transmission is in neutral.

Still another object of the invention is to provide means controlled by one of the transmission shift rails for rendering the speed responsive valve ineffective to control the clutch except when the gear ratios controlled by the rail are established.

Other objects and features of the invention will appear more fully hereinafter from the following detailed description when taken in connection with the accompanying drawing, the single figure of which illustrates one embodiment of the invention in diagrammatic form, certain parts being shown in section. It is to be expressly understood, however, that the drawing is utilized for purposes of illustration only and is not designed as a definition of the limits of the invention, reference being had for this purpose to the appended claims.

Referring to the drawing, the present invention is illustrated therein in connection with a motor vehicle provided with an engine, not shown, adapted through the medium of a belt 4 to drive a speed responsive mechanism 5 in a manner to be more fully described hereinafter. The vehicle is further provided with a transmission mechanism 6 and a clutch controlling member 7. The transmission is provided with shift rails 8 and 9 adapted on longitudinal movement to respectively engage low and reverse gears and second and third speed gears, the shift rail 8 in the present instance being illustrated as occupying the low speed position, while the shift rail 9 occupies neutral position. The speed of the vehicle engine is controlled by means of a throttle rod 10 connected to the engine throttle, not shown, and actuated through the medium of a hydraulic operating cylinder 11 connected therewith and supplied with hydraulic pressure through the medium of a conduit 12 connected with a hydraulic master cylinder 13 having a piston, not shown, and a piston rod 14 adapted to be operated by an accelerator pedal 15, depression of the accelerator pedal thus serving to move the throttle rod 10 to the right and open the throttle in order to increase the speed of the vehicle engine.

In the embodiment of the invention illustrated, a fluid motor 16 mounted on the vehicle by means of a suitable bracket 17 is provided with a piston rod 18 connected to the clutch controlling member 7 through the medium of a pivot pin 19, the construction being such that on the application of fluid pressure to the motor through the medium of a connection 20 the member 7 is moved in a counter-clockwise direction to disengage the clutch, while on the release of pressure from the motor 16, the conventional clutch springs, not shown, serve to engage the clutch and return the member 7 to clutch engaging position.

A reservoir 21 supplied with fluid under pressure from a compressor, not shown, through the medium of a conduit 22, serves as a source of fluid pressure for the operation of the clutch, and the speed responsive mechanism for controlling the application of fluid pressure to the motor 16, may be constructed in accordance with the principles set forth in the patent to Roy S. Sanford, No. 2,228,612, issued January 14, 1941. This centrifugal valve is provided with a pulley 23 driven by the belt 4, this pulley serving through the medium of a shaft 24 to drive a spider 24 provided with pivotally mounted centrifugal weights 26, these weights being in engagement with a movable collar 27 carried by a plunger 28 slidably mounted in a valve housing 29, this plunger serving to operate inlet and exhaust valves 30 and 31 as more fully described in the above mentioned patent. The centrifugal valve is provided with an inlet connection 32, an outlet connection 33 and an exhaust port 34, the construction being such that when the centrifugal valve is operating at low speed, as is the case with the engine idling, the inlet valve 30 is in open position serving to connect the inlet connection 32 with the outlet connection 33, while the exhaust valve 31 is in closed position, serving to disconnect the exhaust port 34 from the outlet connection 33. As the speed of the valve increases in response to an increase in the speed of the engine, the weights moving outward serve to move the valve operating plunger 28 to the right, thus sequentially closing the inlet valve 30 and opening the exhaust valve 31 to connect the exhaust port 34 with the outlet connection 33.

The inlet connection 32 of the centrifugal valve is supplied with fluid pressure through the medium of conduit 35 having a connection with the reservoir 21 through a control valve 36 operated by the gear shifting rail 8, as will be later described, and conduits 37 and 38 as shown, while the outlet port 33 is connected with the fluid motor 16 through the medium of a conduit 39, an accelerator operated valve 40, a conduit 41, a gear shift operated valve assembly 42 and a conduit 43 serving to connect the latter valve assembly with the connection 20 on the fluid motor 16.

The valve mechanism 36 comprises a casing 44 provided with inlet and outlet chambers 46 and 47 respectively, these chambers being separated by a ported partition 48 provided with a valve seat 49, communication between these chambers being controlled by means of an inlet valve 50. The inlet valve 50 is provided with a stem 51 and the upper end of the stem is provided with an exhaust valve 52 adapted to contact the end of an exhaust port 53 formed in a valve operating plunger 54 slidably mounted in the casing and serving in connection with a partition 55 to define an exhaust chamber 56 in the casing. The inlet valve 50 is normally urged to closed position by means of a spring 57 interposed between the underside of the exhaust valve 52 and the upper surface of the partition 48, and with the plunger 54 in downward position as shown, the intake valve 50 serves to open the port 49 to establish a connection between chambers 46 and 47 and the exhaust valve serves to close port 53 in the valve operating plunger to prevent communication between the outlet port 47 and the exhaust chamber 56, the latter chamber being connected with atmosphere through the medium of an exhaust connection 58. Thus with the parts in the position shown, the reservoir 21 is in communication with the inlet connection of the centrifugal valve mechanism 5 through the medium of conduit 38, conduit 37, valve mechanism 36 and conduit 35.

As heretofore stated, the outlet connection from the centrifugal valve passes to the fluid motor 16 through the accelerator operated valve 40 and the gear shift operated valve 42, the valve 40 comprising a casing 59 divided into exhaust and inlet chambers 60 and 61 respectively, the connection between the chambers being controlled by the medium of the valve 62 provided with a stem 63 having a second valve 64 on its lower end normally maintained in the position shown by a spring 64a and adapted to engage a port 65 formed in a plunger 66 slidably mounted in the housing, the port 65 being connected with an outlet connection 67 through the medium of a port 68 formed in the casing. In like manner the chamber 61 is provided with a connection 69 and the chamber 60 is provided with an exhaust port 70, preferably restricted in size, the valves 62 and 64 thus acting in the position shown to establish a connection between the connections 67 and 69 and to prevent a connection between the chamber 61 and the exhaust chamber 60. The throttle cylinder 11 serves to actuate the throttle lever 71, the latter having a connection with the throttle rod 10 through the medium of an auxiliary lever 72 pivotally mounted thereon by the means of a pivot pin 73. With the accelerator pedal and the throttle lever 71 in the position shown, the valve operating plunger 62 occupies the position shown, and is adapted to be moved upward to close the valve 64 and open the valve 62 when the accelerator pedal 31 is fully depressed, this being accomplished through the provision of a cam portion 74 formed on the lever 71 and engaging the lower end of the plunger 66 to move it upward when the engine throttle is fully open.

With reference to the valve 42 operated by the gear shift mechanism, a casing 75 is suitably mounted on the transmission 6 and provided with an inlet chamber 76 as shown. A bore 77 formed on the left side of the valve is provided, and in connection with a partition 78 defines an outlet chamber 79, the partition 78 being provided with a port 80 normally closed by means of an inlet valve 81 provided with a stem 82, the lower end of this stem being provided with an exhaust valve 83. This valve mechanism is normally maintained in the position shown by the means of a spiral spring 84 interposed between the lower side of the partition and the upper face of the exhaust valve 83. The lower portion of the casing is provided with a valve operating plunger 85, slidably mounted therein, the plunger being provided with a central exhaust port 86, the upper end of this port being adapted on upward movement of the plunger to contact the exhaust valve 83, and on further movement to open the inlet valve 81. The port 86 is connected with an exhaust chamber 87 formed in the casing, and the exhaust chamber is provided with an exhaust connection 88 as shown. The valve operating plunger is normally maintained in the position shown by means of a spring 89 interposed between the partition 78 and a collar 90 formed on the valve operating plunger, the lower end of the plunger being formed with a cam shaped end 91 adapted to engage notches 92, 93 and 94 formed on the surface of the shift rail 9. Thus the valve mechanism described serves in the position shown to establish a connection between the connection 88 and the chamber 79, while on upward movement of the plunger during operation of the shift rail 9, the exhaust valve is closed and the intake valve is open, thus breaking the connection between the chamber 79 and the connection 88 and establishing a connection between the chamber 79 and the inlet chamber 76. An identical valve mechanism is provided at the right side of the casing, being provided with an inlet valve 95 and an exhaust valve 96, together with a valve operating plunger 97 having a cam portion 98 formed at its lower end and adapted to engage notches 99, 100 or 101 in the shift rail 8. This latter valve mechanism is provided with an outlet chamber 102 having an outlet connection 103, while the valve operating plunger is provided with an exhaust port 104 having the same arrangement as the exhaust port 86 in the plunger of the left-hand valve and having a connection through a passage 105 formed in the housing and connecting with the chamber 79 of the left-hand valve mechanism. A connection is provided between the inlet chamber 76 and the reservoir 21 through a conduit 106, as shown, the construction being such that on operation of either of the shift rails 8 or 9, as the case may be, one or the other of the valve mechanisms is actuated during shifting movement of the rails to establish a connection between the inlet chamber 76 and the conduit 43 leading to the fluid motor 16, with the result that the vehicle clutch is automatically disengaged during movement of the gear shift rails from one operative position to another. As heretofore stated, the shift rail 8 is shown in low speed position, and in the event it is desired to shift from the low speed position to the neutral position, the shift rail is moved to the right, the plunger 97 being lifted out of the notch 99 to close the exhaust valve 96 and open the exhaust valve 95, and fluid under pressure then being supplied to the motor 16 from the reservoir 21 through conduit 38, conduit 106, inlet chamber 76, inlet valve 95, chamber 102, and conduit 43. As soon as the shift rail is moved to neutral position, the cam portion 98 of the plunger drops into the notch 100, with the result that the valve mechanism is moved to exhaust position, exhausting fluid pressure from the fluid motor to permit re-engagement of the clutch through a path to be later described. In like manner on movement of the shift rail 9 to the left, for example, to engage second speed, the plunger 85 is lifted to close the exhaust valve 83 and open the inlet valve 81 to establish a connection between the inlet chamber 76 and the fluid motor 16 through the open valve 81, the chamber 79, the passage 105, port 104 of the plunger 97, outlet chamber 102, outlet connection 103 and conduit 43. When the shift rail reaches the high speed position, the cam portion 91 on the lower end of the plunger 85 engages the notch 93, permitting the exhaust valve 83 to open and the intake valve 81 to close with the result that the fluid motor is connected with the exhaust connection 88 of the valve through conduit 43, connection 103, chamber 102, port 104, port 105, chamber 79 and port 86 in plunger 85, and is thence exhausted to atmosphere as will later be described. It will be understood in this connection, that the customary mechanical interlocks, not shown, are provided between the shift rails 8 and 9 in order to prevent the movement of one shift rail from neutral position when the other rail is being moved to gear-engaged position, it thus being noted that the valves do not operate simultaneously, but that regardless of which shift rail is operated, one or the other of the valves operates to energize and de-energize the clutch motor in order to disengage and re-engage the clutch automatically during the gear shifting operation in order to prevent the possibility of clashing of the gears and consequent damage thereto.

It will be noted from the foregoing description, that when both of the valves are in exhaust position, the fluid pressure in the motor 16 eventually passes out of the left-hand valve through the outlet connection 88 and conduit 41, and since the valve 64 of the accelerator operated valve mechanism 40 is normally in open position, the fluid thus exhausted is free to pass onward to the outlet connection 33 of the centrifugal valve through chamber 61 of the valve 40, port 65 of the plunger 66, port 68, outlet connection 67 and conduit 39, and in the event the speed of the engine is such that the exhaust valve 31 of the centrifugal valve mechanism 5 is in open position, this fluid will eventually be exhausted to atmosphere through exhaust port 34 of the centrifugal valve. Thus under normal circumstances, the centrifugal valve serves to control entirely the rate of exhaust of fluid pressure from the clutch motor 16 in accordance with variations in engine speed with resultant smooth and efficient engagement of the clutch.

It has also been found desirable to render the centrifugal valve ineffective to control the energization of the clutch motor when the higher gear ratios are engaged, since under these conditions it would otherwise be possible when the vehicle was proceeding on a steep hill at low engine speeds, to have the centrifugal valve act to partially disengage the clutch with resultant slipping of the clutch and damage thereto, and the transmission operated valve mechanism is accordingly arranged so as to prevent the centrifugal valve from being operated to control the energization of the fluid motor 16 when the shift rail 8 is in neutral and the shift rail 9 is in either second or third speed position. This is accomplished through the medium of the valve 36, already described, it being noted that with the shift rail 8 in low speed position as shown, the inlet valve 50 of the valve 36 is in open position while the exhaust valve 52 is closed, the result being that the inlet connection 32 of the centrifugal valve is supplied with fluid pressure from the reservoir 21 through the means heretofore described. If the shift rail 8 is now moved to neutral position, however, it will be noted that the upper end of the valve actuating plunger 54, provided with a cam surface 107, engages a notch 108 formed in the surface of the shift rail 8, with the result that the plunger 54 is moved upward under the action of the air pressure in the chamber 47, permitting the inlet valve 50 to close and prevent communication between the reservoir and the inlet connection 32 of the centrifugal valve, and permitting the exhaust valve to open to exhaust fluid pressure from the centrifugal valve through connection 32, conduit 35, chamber 47 of the valve 36, exhaust port 53 and exhaust connection 58, it being apparent that with the parts in this position, and with the engine running at idling speed so that the inlet valve 30 of the centrifugal valve is in open position, the fluid motor will be free to exhaust to permit engagement of the clutch through conduit 43, valve mechanism 42, conduit 41, valve mechanism 40, conduit 39, outlet connection 33, past the valve 30 of the centrifugal valve and through inlet connection 32, conduit 35, chamber 47 of the valve 36, exhaust port 53 and exhaust connection 58. Thus when the shift rail 8 is in neutral position, the centrifugal valve is ineffective to control the operation of the clutch motor 16, and in view of the fact that the shift rail 8 remains in neutral position during operation of the shift rail 9 to engage second or third speeds, it will be apparent that the centrifugal valve is also ineffective when second or third speed is engaged, and that the clutch will remain engaged when the transmission is in neutral as well as when second and third speeds are engaged.

Thus the centrifugal valve is effective only when first or reverse speeds are engaged by corresponding movements of the shift rail 8, and in order to prevent a condition occurring in low and reverse gears wherein slipping of the clutch occurs due to the vehicle traveling up a steep grade at extremely low motor speeds, the valve 40, already described, is provided and is so controlled by the operation of the accelerator pedal 15 as to disconnect the fluid motor 16 from the centrifugal valve 5 and to exhaust fluid pressure from the fluid motor 16 in order to insure complete clutch engagement whenever the operator fully depresses the accelerator pedal. As previously described, the valve 40 serves with the parts in the position shown to establish a connection between conduits 41 and 39, and serves when the accelerator pedal is fully depressed to break this connection and establish a connection between the conduit 41 and the exhaust port 70 of the valve, the result being that when traveling in reverse or low gear, the operator, on encountering conditions tending to cause slipping of the clutch under the control of the centrifugal valve with resultant damage thereto, has only to fully depress the accelerator pedal, whereupon the centrifugal valve is rendered ineffective temporarily to energize the fluid motor 16 sufficiently to cause partial clutch disengagement and consequent clutch slipping.

Thus the control valve 36, actuated by the operation of the shift rail 8, serves to perform the dual function of rendering the centrifugal clutch valve ineffective when second and third speeds are engaged, due to the necessity of maintaining the shift rail 8 in neutral position during this type of operation, and also of preventing energization of the clutch motor by the operation of the centrifugal valve when the gear shift is in neutral and the engine is idling, in order to prevent unnecessary load and wear on the thrust bearing of the clutch mechanism. There has thus been provided in connection with an automatic clutch control mechanism, means for automatically safeguarding the clutch mechanism against abuse on the part of the operator under all operating conditions.

While one embodiment of the present invention has been illustrated and described herein with considerable particularity, it is to be understood that the same is not limited thereto but may be embodied in the variety of expressions as will be understood by those skilled in the art. Reference, will, therefore, be had to the appended claims for a definition of the limits of the invention.

What is claimed is:

1. The combination in a motor vehicle having an engine, a transmission provided with a shiftable element movable to gear engaging and neutral positions for establishing and dis-establishing a desired gear ratio, a clutch controlling member, and a fluid actuator for controlling the operation of said member, of means for controlling the operation of said actuator including valve means responsive to the speed of the engine for controlling energization of said actuator, and valve means actuated by movement of said shiftable element for rendering said speed responsive valve means effective to control energization of said actuator when said element is in gear engaging position and ineffective to control energization of said actuator when said element is in neutral position.

2. The combination in a motor vehicle having an engine, a transmission, a shiftable element movable to gear engaging and neutral positions for establishing and dis-establishing a desired gear ratio, a clutch controlling member, a fluid motor for controlling the operation of said member, and a source of fluid pressure, of means for controlling the operation of said motor including a connection between said source and motor for supplying fluid pressure thereto, means including a valve associated with said connection and responsive to variations in engine speed for controlling the supply of fluid pressure from said source to said motor through said connection, and valve mechanism associated with said connection and actuated by movement of said element for permitting the supplying of fluid pressure to said valve through said connection when said element is in gear engaging position and for preventing the supplying of fluid pressure thereto when the element is in neutral position.

3. The combination in a vehicle having an engine, a clutch controlling member, a fluid motor for controlling the operation of said member, a source of fluid pressure, means including a valve responsive to variations in engine speed for controlling the supplying of fluid pressure from said source to said motor, and a transmission having a shiftable rail movable to neutral position and movable to another position to establish a desired gear ratio and a second shiftable rail movable to neutral position and to another position to establish a higher gear ratio, of valvular means controlled by movement of either of said rails for supplying fluid pressure to said motor during movement of said rails from neutral to gear engaging position, and valve means controlled by movement of said first named rail for supplying fluid pressure to said speed responsive valve when the rail is in gear engaging position and for preventing the supplying of fluid pressure to said valve when the rail is in neutral position.

4. The combination in a vehicle having an engine, a transmission having shiftable elements having neutral positions and movable for establishing desired gear ratios, a clutch controlling member, and a fluid actuator for operating said member, of means for controlling the operation of said actuator including means responsive to the speed of the engine for controlling the supply of fluid pressure to said actuator, means controlled by movement of said elements for supplying fluid pressure to said actuator during movement of said elements to establish and dis-establish said desired gear ratios, and means controlled by the operation of one of said elements for rendering the speed responsive means ineffective to control the supply of fluid pressure to said actuator when said one element is in neutral position.

5. The combination in a vehicle having an engine, a transmission having shiftable elements having neutral positions and movable for establishing desired gear ratios, a clutch controlling member, and a fluid actuator for operating said member, of means for controlling the operation of said actuator including means responsive to the speed of the engine for controlling the supply of fluid pressure to said actuator, means controlled by movement of said elements for supplying fluid pressure to said actuator during movement of said elements to establish and dis-establish said desired gear ratios, and means operable on movement of said elements to neutral position for rendering the speed responsive means ineffective for controlling the supply of fluid pressure to said actuator.

6. The combination in a vehicle having an engine, a transmission having shiftable elements having neutral positions and movable for establishing desired gear ratios, a clutch controlling member, and a fluid actuator for operating said member, of means for controlling the operation of said actuator including means responsive to the speed of the engine for controlling the supply of fluid pressure to said actuator, means controlled by movement of said elements for supplying fluid pressure to said actuator during movement of said elements to establish and dis-establish said desired gear ratios, and valvular means controlled by the operation of one of said elements for rendering the speed responsive means ineffective to control the supply of fluid pressure to said actuator when said one element is in neutral position, regardless of the position of the other elements.

7. The combination in a vehicle having an engine, a transmission having shiftable elements for establishing desired gear ratios, a clutch control member, a fluid actuator for operating said member, a source of fluid pressure, and a pair of connections for supplying fluid pressure from said source to said actuator, of means for controlling the flow of fluid pressure through said connections including a valve operated by shifting movement of each element for controlling the flow of fluid pressure through one of said connections, and means for controlling the flow of fluid pressure through the other connection including a valve responsive to engine speed and a valve controlled by one of said elements for preventing the flow of fluid pressure through said other connection from said source when said one element is in neutral position.

8. The combination in a vehicle having an engine, a transmission having shiftable elements for establishing desired gear ratios, a clutch control member, a fluid actuator for operating said member, a source of fluid pressure, and a pair of connections for supplying fluid pressure from said source to said actuator, of means for controlling the flow of fluid pressure through said connections including serially connected valves operated by shifting movement of each element for controlling the flow of fluid pressure through one of said connections, a pair of serially connected valves for controlling the flow of fluid pressure from said source to said actuator through the other connection, means responsive to engine speed for controlling one of said pair of valves, and means controlled by movement of one of said elements for operating the other of said pair of valves for preventing the flow of fluid pressure from said source to said actuator through said other connection when said one element is in neutral position.

9. The combination in a vehicle having an engine, a transmission having shiftable elements for establishing desired gear ratios, a clutch control member, a fluid actuator for operating said member, a source of fluid pressure, and a pair of connections for supplying fluid pressure from said source to said actuator, of means for controlling the flow of fluid pressure through said connections including serially connected valves operated by shifting movement of each element for controlling the flow of fluid pressure through one of said connections, and means for controlling the flow of fluid pressure in said other connection including a valve responsive to engine speed and a valve controlled by one of said elements for preventing the flow of fluid pressure from said source to said actuator through said speed responsive valve when said one element is in neutral position.

10. The combination in a vehicle having an engine provided with a throttle, an accelerator for controlling the throttle, a transmission having shiftable elements for establishing desired gear ratios, a clutch control member, a fluid actuator for operating said member, a source of fluid pressure, and a pair of connections for supplying fluid pressure from said source to said actuator, of means for controlling the flow of fluid pressure in said connections including valve means controlled by movement of said elements for permitting the flow of fluid pressure from said source to said actuator through one of said connections during shifting movement of said elements, and means for controlling the flow of fluid pressure through said other connection including a valve controlled by the accelerator, a valve responsive to engine speed, and a valve controlled by one of said elements for preventing the flow of fluid pressure to said actuator through said other connection when said one element is in neutral position.

11. The combination in a vehicle having an engine provided with a throttle, an accelerator for controlling the throttle, a transmission having shiftable elements for establishing desired gear ratios, a clutch control member, a fluid actuator for operating said member, a source of fluid pressure, and a pair of connections for supplying fluid pressure from said source to said actuator, of means for controlling the flow of fluid pressure in said connections including valve means controlled by movement of said elements for permitting the flow of fluid pressure from said source to said actuator through one of said connections during shifting movement of said elements, and means for controlling the flow of fluid pressure through said other connection including serially connected valves controlled respectively by means responsive to the speed of the engine, by the accelerator, and by one of said elements, the valve controlled by said element being effective to prevent the flow of fluid pressure to said actuator through said other connection when said one element is in neutral position.

12. The combination in a vehicle having an engine, a transmission having shiftable elements for establishing desired gear ratios, a clutch control member, a fluid actuator for operating said member, a source of fluid pressure, and a valve operated by each of said elements for connecting said source and actuator during shifting movement of said elements and for exhausting fluid pressure from said actuator when the operating element is in neutral or in gear establishing position, of other means for connecting said actuator and source and for exhausting fluid pressure from said actuator including a valve having a connection with said source operable when the speed of the engine is less than a predetermined value to connect said source and actuator and operable when the engine speed increases above said predetermined value to exhaust fluid pressure from the actuator, and a valve operated by movement of one of said elements for closing the connection between said speed operable valve and source and exhausting fluid pressure from the speed operable valve when said one element is in neutral position and for opening said connection when said one element is moved to gear establishing position.

ARTHUR R. LEUKHARDT.